United States Patent [19]

Winnik et al.

[11] Patent Number: 5,266,106

[45] Date of Patent: * Nov. 30, 1993

[54] INK COMPOSITIONS WITH DENDRIMER GRAFTS

[75] Inventors: Francoise M. Winnik, Toronto; Marcel P. Breton, Mississauga, both of Canada

[73] Assignee: Xerox Corporation, Stamford, Conn.

[*] Notice: The portion of the term of this patent subsequent to Mar. 24, 2009 has been disclaimed.

[21] Appl. No.: 964,802

[22] Filed: Oct. 22, 1992

[51] Int. Cl.$^5$ ............................................. C09D 11/02
[52] U.S. Cl. ................................. 106/22 K; 106/20 D
[58] Field of Search .................. 106/200, 22 R, 22 H, 106/22 K

[56] References Cited

U.S. PATENT DOCUMENTS

| | | | |
|---|---|---|---|
| 4,623,689 | 11/1986 | Shintani et al. | 524/457 |
| 4,664,708 | 5/1989 | Allen | 106/22 |
| 4,680,332 | 7/1987 | Hair et al. | 524/377 |
| 4,705,567 | 11/1987 | Hair et al. | 106/20 |
| 4,791,165 | 12/1988 | Bearss et al. | 524/516 |
| 4,877,451 | 10/1989 | Winnik et al. | 106/23 |
| 5,120,361 | 6/1992 | Winnik et al. | 106/22 |

*Primary Examiner*—Helene Klemanski
*Assistant Examiner*—Margaret Einsmann
*Attorney, Agent, or Firm*—E. D. Palazzo

[57] ABSTRACT

An ink composition comprised of a solution comprised of a a dye and a grafted dendrimer.

16 Claims, No Drawings

INK COMPOSITIONS WITH DENDRIMER GRAFTS

BACKGROUND OF THE INVENTION

The present invention is directed to ink compositions, and imaging and printing processes thereof. More specifically, in embodiments the present invention is directed to ink jet ink compositions with improved latency characteristics useful for printing on a variety of papers and substrates, and wherein the inks contain dendrimer grafts, such as dendrimers grafted with nonionic alkylene oxide oligomers. The inks can be formulated after mixing water, and the grafted dendrimer by the addition, for example, of a cosolvent comprised of water and a glycol, like ethylene glycol, diethylene glycol, thereby improving latency, which is the maximum time period as illustrated herein, over which an uncapped ink jet printhead can remain idle before noticeable deterioration of its jetting performances. Also, the addition of glycol permits the adjustment of the ink viscosity from about 1.1 to about 5 centipoise, and preferably from about 1.1 to about 3.0 centipoise, and can permit adjustment of the ink surface tension. Viscosity and surface tensions are important contributing factors in the production of excellent quality prints on plain papers, that is prints with acceptable edge acuity, or the sharpness of the edge between the printed and nonprinted areas, minimal ink feathering on paper, and characterized, for example, by a desirable uniformity of solid area ink coverage. The inks of the present invention can be selected for a number of known ink jet printing methods and apparatus, including thermal ink jet, or bubble jet processes as described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of which are totally incorporated herein by reference. Rapid drying and excellent waterfastness, in embodiments of the present invention from between 90 to about 99 percent, are of value in rapid printing applications such as printing by xerography at a speed of 50 to 100 copies per minutes. Also, in embodiments the inks of the present invention possess water staining resistance.

Ink jet printing systems can generally be classified as continuous stream and drop-on-demand. In drop-on-demand systems, a droplet is ejected from an orifice directly to a position on a recording medium in accordance with digital data signals. A droplet is not usually formed or expelled unless it is to be placed on the recording medium. A second type of drop-on-demand system is known as thermal ink jet, or bubble jet. With this type, there are apparently generated high velocity droplets and there is allowed very close spacing of the nozzles. Thermal ink jet processes are well known as indicated herein, and are described, for example, in U.S. Pat. Nos. 4,601,777; 4,251,824; 4,410,899; 4,412,224 and 4,532,530, the disclosures of each of which are totally incorporated herein by reference.

Known ink jet inks generally comprise a water soluble dye which is soluble in an ink vehicle such as water or a mixture comprising water and a known water soluble or water miscible organic solvent. Inks comprising these soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of these known dyes contained in inks may be potentially toxic or mutagenic. These problems can be minimized by replacing the dyes used in ink formulations with insoluble pigments. Although not being desired to be limited by theory, it is believed in embodiments of the present invention that the improvement in latency can be caused by a complexation between the dye and the grafted dendrimer. Thus, the latency of an ink containing Food Black #2, having the largest number of complexation sites (4 sulfonate groups), is increased much more in presence of the grafted dendrimers than the latency of an ink containing Direct Black 168 (3 sulfonate groups). In general, pigments are superior to dyes with respect to waterfastness, lightfastness, image density, thermal stability, oxidative stability, compatibility with both coated/treated and plain papers, image edge acuity, and nontoxic and nonmutagenic properties.

Heterophase ink jet inks are known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion is comprised of a polymer obtained from monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 4,877,451, the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, in copending application U.S. Ser. No. 07/369,003, the disclosure of which is totally incorporated herein by reference, there are illustrated ink jet inks and liquid developers containing colored particles comprising hydrophilic porous silica particles to the surfaces of which dyes are covalently bonded through silane coupling agents. The ink compositions of this patent are believed to be less stable in the printheads, and less stable during storage, disadvantages avoided, or minimized with the inks of the present invention.

In U.S. Pat. No. 5,120,361, the disclosure of which is totally incorporated herein by reference, there is disclosed an ink composition comprised of a solution comprised of a dendrimer and a dye or dyes, which dyes are visible, or can be seen under normal viewing conditions, and wherein the dendrimer can be a first, second or third generation dendrimer.

In copending application U.S. Ser. No. 904,318, there are illustrated ink jet inks comprised of an aqueous liquid vehicle comprised of certain dyes and dendrimers. In one embodiment, the inks of the copending application are comprised of a solution comprised of a porphyrin type dye and a dendrimer.

In U.S. Pat. No. 5,145,518 there is disclosed an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being detectable when exposed to radiation outside the visible wavelength range; and in U.S. Ser. No. 834,093 there is disclosed an ink composition comprised of a solution comprised of a dye comprised of a porphyrin chromophore. The disclosures of each of the copending applications are totally incorporated herein by reference.

SUMMARY OF THE INVENTION

It is an object of the present invention to provide ink compositions with many of the advantages illustrated herein.

It is another object of the present invention to provide ink jet compositions with certain dyes comprised of grafted dendrimers.

Another object of the present invention is to provide rapid drying ink compositions drying in less than one minute on plain papers.

It is yet another object of the present invention is to provide ink compositions with improved latency characteristics.

Yet another object of the present invention is to provide ink compositions that can be prepared by simple and economical processes.

It is another object of the present invention to provide ink compositions suitable for printing on plain papers, coated or treated papers, and transparency materials.

It is still another object of the present invention to provide in embodiments ink compositions with water staining resistance.

Another object of the present invention is to provide ink compositions with acceptable thermal and storage stability.

Moreover, another object of the present invention is to provide ink compositions suitable for ink jet printing, which inks do not induce or minimize clogging of the ink printheads.

These and other objects of the present invention can be accomplished in embodiments thereof by providing an ink composition which comprises an aqueous liquid vehicle comprised of grafted dendrimers. It is believed that the grafted dendrimers can form a dye-dendrimer entity which improves the solubility of the dye in the ink cosolvents and thus the latency of thermal ink jet inks. In embodiments, the present invention is directed to an ink composition comprised of a solution comprised of a dye and a grafted dendrimer, especially a dendrimer grafted with a nonionic alkylene, such as ethylene, oxide oligomer.

The liquid vehicle of the inks of the present invention can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water, the humectants, a grafted dendrimer generally possess absorption characteristics on paper and evaporation properties allowing for the desired ink jet printing speed when the ink is to be used in an ink jet printing process. With the inks of the present invention, in embodiments the liquid vehicle can be present in an amount of from about 50 to about 99.5 percent by weight, and preferably from about 75 to about 99 percent by weight.

Optional additives can also be present in the inks of the present invention as indicated herein. For example, one or more surfactants or wetting or dispersing agents can be added to the ink. These additives may be of the cationic, anionic, amphoteric, or nonionic types. Suitable surfactants and wetting or dispersing agents include TAMOL® SN, TAMOL® LG, those of the TRITON® series available from Rohm and Haas Company, those of the MARASPERSE® series, those of the IGEPAL® series available from GAF Company, those of the TERGITOL® series, STRODEX PK-90 TM available from GAF, PLURONIC F-68 TM available from BASF, KARASPERSE TU TM available from Marasperse, and other commercially available surfactants. These surfactants and wetting agents are present in any effective amounts, generally from 0 to about 15 percent by weight, and preferably from about 0.01 to about 8 percent by weight.

Polymeric additives or dispersants in effective amounts of, for example, 1 to about 15 weight percent for enhancing the viscosity of the ink can also be added to the inks of the present invention. Examples include water soluble polymers, such as gum arabic, polyacrylate salts, polymethacrylate salts, polyvinyl alcohols, hydroxypropylcellulose, hydroxyethylcellulose, polyvinylpyrrolidinone, polyvinylether, starch, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine (HPPEI-200) or other polyethyleneimine derivatives can be added to the ink.

Other optional additives for further improving the jetting characteristics and the storage stability of the inks, and for preventing undesirable interactions of the inks with the printhead either during the jetting process or while the printer is idle for the inks of the present invention as illustrated herein, include humectants such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL ™ 75, 150, and 200, benzoate salts, sorbate salts, and the like, present in an effective amount of, for example, from about 0.0001 to about 4 percent by weight, and preferably from about 0.01 to about 2.0 percent by weight; and pH controlling agents, such as acids or bases, phosphate salts, carboxylate salts, sulfite salts, amine salts, and the like, present in an amount of from 0 to about 5 percent by weight and preferably from about 0.01 to about 2 percent by weight, bases present in an amount of from 0 to about 10 percent by weight and preferably from about 4 to about 8 percent by weight, or the like.

Dendrimers can be considered radially symmetrical molecules of a STARBURST ™ topology comprised of an initiator core, such as nitrogen, ethylenediimine, and the like, interior layers attached to the core and comprised of, for example, three or four arms, each arm being comprised of repeating units with the number of repeating units in each arm being considered the generation of the dendrimer, and terminal functional groups functionality, such as, for example, a primary amine attached to the outermost generation, which dendrimers are illustrated, for example, in U.S. Pat. Nos. 4,507,466; 4,631,337; 4,558,120; 4,568,737 and 4,587,329; and in D. A. Tomalia, A. M. Naylor, and W. A. Goddard III, *Angewandte Chemie, Int.* Ed. Engl. 29, 138 (1990), the disclosure of which are totally incorporated herein by reference. The size and shape of the STARBURST ™ dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythriol or tris-(hydroxymethyl)ethane, 1,1,1-tris-(4'-hydroxyphenyl)-ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Fréchet, *J. Am. Chem. Soc.*, 112, 7638 (1990), the disclosure of which is totally incorporated herein by reference. Examples of dendrimers prepared by the divergent approach include the STARBURST ™ available from Polysciences, Inc., in which the terminal functional groups are primary amino groups, and which range in average diameter of from about 10.8 Angstroms (first generation) to about 83.9 Angstroms (8th generation).

Grafted dendrimer examples as illustrated herein, such as STARBURST ™, are generally present in an effective amount such as a concentration of from about 0.01 percent by weight to about 10 percent by weight, and preferably from about 0.05 percent by weight to about 5 percent by weight, and admixed with water, preferably water that has been distilled or deionized, to obtain a clear solution.

The dendrimers are grafted with, for example, nonionic alkylene with, for example, from 1 to about 12 carbon atoms, oxide oligomers, especially ethylene oxide oligomers, and these grafted dendrimers were obtained from Michigan Molecular Institute. Specific grafted dendrimers include dendrimers of the first generation comprised of an ethylenediamine core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the second generation comprised of an ethylenediamine core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the third generation consisting of an ethylenediamine core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the fourth generation comprised of an ethylenediamine core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the first generation consisting of a polyamidoamine (PAMAM) core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the second generation consisting of a PAMAM core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the third generation consisting of a PAMAM core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units, dendrimers of the fourth generation consisting of a PAMAM core and of arms terminated with primary amines to which are linked ethylene oxide oligomers in an average amount of about 5 percent of the total number of primary amines to about 95 percent of the total number of primary amines; the ethylene oxide oligomers comprised of from about 2 to about 45 ethylene oxide repeat units; and the like. Also, in embodiments of the present invention there can be selected mixtures of the grafted dendrimers such as, for example, a mixture of two grafted dendrimers with dissimilar grafting percentages like 5 percent grafting + 95 percent grafting (or 0 percent grafting + 95 percent grafting), and the like as a further means to, it is believed, control latency.

Mixtures of grafted dendrimers may also be selected in embodiments of the present invention or mixtures of grafted and nongrafted dendrimers.

Ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ ™ printer, Hewlett Packard DESK JET ™ printers, the DIABLO C150 TIJ ™ printer, or the like. Particularly preferred is a thermal ink jet printing apparatus. The inks of the present invention can be used to form images on a wide variety of substrates, including plain paper such as Xerox 4024 paper, bond paper such as GILBERT ® 25 percent cotton bond paper or GILBERT ® 100 percent cotton bond paper, silica coated papers, transparency materials, fabrics, plastics, polymeric films, and the like.

The ink compositions of the present invention can be prepared by various suitable processes. Typically, the inks are prepared by simple mixing of the ingredients. One process embodiment entails mixing all of the ink ingredients together and filtering the mixture to obtain an ink. Optionally, the mixture obtained after mixing all the ingredients can be heated to a temperature of from about 40° C. to about 55° C. for a period of from about 2 to about 3 hours, subsequently cooling the mixture to room temperature (typically from about 10° to about 35° C.) and filtering the mixture to obtain an ink. More specifically, the inks of the present invention can be prepared by (1) adding a solution in water of the grafted dendrimer dye to a magnetically stirred solution in water containing a humectant and a biocide resulting in a solution containing the dendrimer in an amount of from about 0.01 percent by weight to about 10 percent by weight, and preferably from about 0.05 to about 5 percent by weight, the dye in an amount of from about 0.01 to about 10 percent by weight and preferably from about 1 to about 6 percent by weight, a humectant in an amount of from about 0 to about 70 percent by weight and preferably from about 3 to about 50 percent by weight, a biocide in an amount of from about 0.0001 to about 4 percent by weight and preferably from about 0.01 to about 2 percent by weight, and water from about 29.5 to 99 percent by weight and preferably from about 49.5 to 94 percent by weight, this solution being kept at a temperature ranging from 10° to 30° C., and preferably from 20° to 25° C.; (2) stirring the resulting mixture at a temperature ranging from 20° to 25° C. for a period of 2 to 24 hours, and preferably 10 to 15 hours; optionally the mixture can be heated to a temperature ranging from 30° to 60° C. for a period of time ranging from 30 minutes to 2 hours; (3) filtering the resulting mixture through a 0.45 micron N filter; and (4) adjusting the ink pH, measured with an Omega pH-meter, to a value ranging from 6.5 to 10.5 by dropwise addition of an aqueous solution of an acid, such as for example hydrochloric acid or acetic acid.

Specific embodiments of the invention will now be described in detail. These Examples are intended to be illustrative, and the invention is not limited to the materials, conditions, or process parameters set forth in these embodiments. All parts and percentages are by weight unless otherwise indicated. Examples with control inks (Examples I, II, V, and VIII) are also provided. Further, tabulated inks and data are also provided.

EXAMPLE I

There was prepared a control ink (A-1) as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 3 percent by weight of Food Black #2 obtained from Mobay Chemicals, and 73.45 percent by weight of deionized water. The mixture was filtered through a 0.45 micron filter. The composition of this ink was substantially identical to that of the ink described in Examples II, III and IV, except that it did not contain a dendrimer. The physical characteristics of this ink were substantially similar to those of the ink described in Examples II, III and IV with respect to viscosity (2.21 centipoise), pH (7.66), and surface tension values (47.8 millinewtons per meter), however, the latency value at 15 percent RH for the control ink was 100 seconds as illustrated herein in embodiments (Examples III and IV).

EXAMPLE II

There was prepared a control ink (A-2) composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of a first generation amino terminated STARBURST ™ dendrimer of the first generation obtained from the Michigan Molecular Institute, 3 percent by weight of Food Black #2 obtained from Mobay Chemicals and 72.95 percent by weight of deionized water. The mixture was filtered through a 0.45 micron filter. The composition of this ink was substantially identical to that of the ink described in Examples III and IV, except that it contained a dendrimer which was not grafted. The physical characteristics of this ink were substantially similar to those of the inks described in Examples I, III and IV, with respect to viscosity (2.25 centipoise), pH (8.53), and surface tension values (48.6 millinewtons per meter), however, the latency and recoverability values are lower, as illustrated herein in embodiments. The ink thus prepared was incorporated in a DESK JET ™ Hewlett Packard ink jet printer. Prints were formed on Rolland, Hammermill Fore DP/20 pounds, Nekoosa Ardor Xerocopy/20 pounds, Classic Crest/24 pounds (Kimberley-Clark Inc.), and IP Alkaline (Ticonderoga) papers. On these papers and in the order shown here, the prints exhibited a waterfastness of 62, 71, 72, 49 and 71 percent as determined by cutting a printed solid area on the selected paper (wire side) into two sheets, soaking one sheet in water for 2 minutes, air drying the soaked sheets for 24 hours at ambient temperature, and measuring the optical densities of both the soaked and unsoaked sheets illuminated under identical conditions. The ink had a latency of 45 seconds at 15 percent RH, a latency substantially lower than for the inks of the present invention containing grafted dendrimers (Examples III and IV).

EXAMPLE III (A-3)

There was prepared an ink composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of a STARBURST ™ dendrigraft of the first generation in which approximately 50 percent of the primary amines are grafted with ethylene oxide oligomers with 7 ethylene oxide repeat units (DRS-1-9), and which was obtained from the Michigan Molecular Institute, 3 percent by weight of Food Black #2 obtained from Mobay Chemicals and 72.95 percent by weight of deionized water. This solution was stirred with a magnetic stirrer for 3 hours. The mixture was filtered through a 0.45 micron filter. There resulted a black ink with a viscosity of 2.26 centipoise, a surface tension of 47.5 millinewtons per meter, and a pH of 8.49. The ink thus prepared was incorporated in a DESK JET ™ Hewlett Packard ink jet printer. Prints were formed on Rolland, Hammermill Fore DP/20 pounds, Nekoosa Ardor Xerocopy/20 pounds, Classic Crest/24 pounds (Kimberley-Clark Inc.), and IP Alkaline (Ticonderoga) papers. On these papers and in the order shown, the prints exhibited a waterfastness of 35, 66, 59, 27 and 65 percent as determined by cutting a printed solid area on the selected paper (wire side) into two sheets, soaking one sheet in water for 2 minutes, air drying the soaked sheets for 24 hours at ambient temperature, and measuring with a Macbeth TR927 optical densitometer the optical densities of both the soaked and unsoaked sheets illuminated under identical conditions. The ink has a latency (a property characteristic of the ink-printhead interaction and by adding a dendrigraft the resulting ink does not deteriorate the print quality, reference for example the waterfastness; other properties that are not adversely affected are feathering, edge acuity, or kogation of the printhead heater; when the latency is very short, the printhead could clog almost immediately, and this would adversely affect print quality) of 200 seconds at 15 percent RH, a latency substantially higher than for an ink containing a dendrimer to which was not grafted ethylene oxide oligomers (Example II).

EXAMPLE IV (A-4)

There was prepared an ink composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of the STARBURST ™ dendrigraft of the first generation in which approximately 95 percent of the primary amines are grafted with ethylene oxide oligomers with 7 ethylene oxide repeat units (DRS-1-10), and which dendrigraft was obtained from the Michigan Molecular Institute, 3 percent by weight of Food Black #2 obtained from Mobay Chemicals and 72.95 percent by weight of deionized water. This solution was stirred with a magnetic stirrer for 3 hours. The mixture was filtered through a 0.45 micron filter. There resulted a black ink with a viscosity of 2.20 centipoise, a surface tension of 48.2 millinewtons per meter, and a pH of 8.48. The ink thus prepared was incorporated in a DESK JET ™ Hewlett Packard ink jet printer. Prints were formed on Rolland, Hammermill Fore DP/20 pounds, Nekoosa Ardor Xerocopy/20 pounds, Classic Crest/24 pounds (Kimberley-Clark Inc.), and IP Alkaline (Ticonderoga) papers. On these papers and in the order shown here, the prints exhibited a waterfastness of 35, 61, 61, 24 and 63 percent as determined by cutting a printed solid area on the selected paper (wire side) into two sheets, soaking one sheet in water for 2 minutes, air drying the soaked sheets for 24 hours at ambient temperature, and measuring with a Macbeth TR927 Optical Densitometer the optical densities of both the soaked and unsoaked sheets illuminated under identical conditions. The ink has a latency of 150 seconds at 15 percent RH, a latency substantially higher than for an ink containing a dendrimer to which was not grafted ethylene oxide oligomers (Example II).

EXAMPLE V

There was prepared a control ink (B-1) composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of a first generation amino terminated STARBURST ™ dendrimer of the first generation obtained from the Michigan Molecular Institute, 3 percent by weight of DIRECT BLACK 168 ™ obtained from ICI Colours and Fine Chemicals, England and 72.95 percent by weight of deionized water. The mixture was filtered through a 0.45 micron filter. The composition of this ink was substantially identical to that of the ink described in Examples VI and VII except that it contained a dendrimer which was not grafted. The physical characteristics of this ink were substantially identical to those of the ink described in Examples VI and VII with respect to viscosity (2.23 centipoise), pH (8.61), and surface tension values (44.8 millinewtons per meter), however, the latency and recoverability values are lower, as illustrated herein in embodiments. The ink thus prepared was incorporated in a DESK JET ™ Hewlett Packard ink jet printer. Prints were formed on Rolland, Hammermill Fore DP/20 pounds, Nekoosa Ardor Xerocopy/20 pounds, Classic Crest/24 pounds (Kimberley-Clark Inc.), and IP Alkaline (Ticonderoga) papers. On these papers and in the order shown here, the prints exhibited a waterfastness of 68, 79, 77, 61, and 90 percent as determined by cutting a printed solid area on the selected paper (wire side) into two sheets, soaking one sheet in water for 2 minutes, air drying the soaked sheets for 24 hours at ambient temperature, and measuring with a Macbeth TR927 Optical Densitometer the optical densities of both the soaked and unsoaked sheets illuminated under identical conditions. The ink has a latency of 50 seconds at 15 percent RH, substantially identical to the latency of Example VII.

EXAMPLE VI (B-2)

There was prepared an ink composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of the STARBURST TM dendrigraft of the first generation in which approximately 50 percent of the primary amines are grafted with ethylene oxide oligomers with 7 ethylene oxide repeat units (DRS-1-9) obtained from the Michigan Molecular Institute, 3 percent by weight of DIRECT BLACK 168 TM obtained from ICI Colours and Fine Chemicals, England and 72.95 percent by weight of deionized water. This solution was stirred with a magnetic stirrer for 3 hours. The mixture was filtered through a 0.45 micron filter. There resulted a black ink with a viscosity of 2.19 centipoise, a surface tension of 48.0 millinewtons per meter, and a pH of 8.48. The ink thus prepared was incorporated in a DESK JET TM Hewlett Packard ink jet printer. Prints were formed on Rolland, Hammermill Fore DP/20 pounds, Nekoosa Ardor Xerocopy/20 pounds, Classic Crest/24 pounds (Kimberley-Clark Inc.), and IP Alkaline (Ticonderoga) papers. On these papers and in the order shown here, the prints exhibited a waterfastness of 53, 81, 76, 42, 86 percent as determined by cutting a printed solid area on the selected paper (wire side) into two sheets, soaking one sheet in water for 2 minutes, air drying the soaked sheets for 24 hours at ambient temperature, and measuring with a Macbeth TR927 Optical Densitometer the optical densities of both the soaked and unsoaked sheets illuminated under identical conditions. This ink had a latency of 30 seconds at 15 percent RH.

EXAMPLE VII (B-3)

There was prepared an ink composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of the STARBURST TM dendrigraft of the first generation in which approximately 95 percent of the primary amines are grafted with ethylene oxide oligomers with 7 ethylene oxide repeat units (DRS-1-10) obtained from the Michigan Molecular Institute, 3 percent by weight of DIRECT BLACK 168 TM obtained from ICI Colours and Fine Chemicals, England and 72.95 percent by weight of deionized water. This solution was stirred with a magnetic stirrer for 3 hours. The mixture was filtered through a 0.45 micron filter. There resulted a black ink with a viscosity of 2.33 centipoise, a surface tension of 47.4 millinewtons per meter, and a pH of 8.33. The ink thus prepared was incorporated in a DESK JET TM Hewlett Packard ink jet printer. Prints were formed on Rolland, Hammermill Fore DP/20 pounds, Nekoosa Ardor Xerocopy/20 pounds, Classic Crest/24 pounds (Kimberley-Clark Inc.), and IP Alkaline (Ticonderoga) papers. On these papers and in the order shown here, the prints exhibited a waterfastness of 57, 80, 75, 49, 82 percent as determined by cutting a printed solid area on the selected paper (wire side) into two sheets, soaking one sheet in water for 2 minutes, air drying the soaked sheets for 24 hours at ambient temperature, and measuring with a Macbeth TR927 Optical Densitometer the optical densities of both the soaked and unsoaked sheets illuminated under identical conditions. The ink has a latency of 50 seconds at 15 percent RH, substantially higher than the latency of the ink described in Example VI which contains a dendrimer with only 50 percent of the primary amines modified by grafting ethylene oxide oligomer chains. This result indicates that the latency of the ink may be controlled in embodiments by the level of grafting of the dendrimer; if more ethylene oxide oligomers are attached to the dendrimer, the latency improves (reference, for example, the comparison between the dendrimer having 50 percent grafting and the one with 95 percent grafting; thus there is provided a means to adjust the latency).

EXAMPLE VIII

There was prepared a control ink (C-1) as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 3.45 percent by weight of BASACID BLACK X-34 TM obtained from BASF Chemicals and 73.00 percent by weight of deionized water. The mixture was filtered through a 0.45 micron filter. The composition of this ink was substantially identical to that of the ink described in Examples IX and X except that it did not contain a dendrimer. The physical characteristics of this ink were substantially similar to those of the inks described in Examples IX and X with respect to viscosity (2.12 centipoise), and surface tension values (48.0 millinewtons per meter). The ink has a latency of 60 seconds at 15 percent RH, also substantially similar to the latency of Examples IX and X.

EXAMPLE IX (C-2)

There was prepared an ink composition as follows. A solution was prepared by combining at room temperature, about 25° C. throughout, 20 percent by weight of ethylene glycol, obtained from BDH Inc., Toronto, Ontario, 3.5 percent by weight of isopropanol obtained from Aldrich Chemical Corporation, 0.05 percent by weight of polyethylene oxide, $M_w$ 18,500, obtained from Polysciences, 0.5 percent by weight of the STARBURST TM dendrigraft of the first generation in which approximately 50 percent of the primary amines are grafted with ethylene oxide oligomers with 7 ethylene oxide repeat units (DRS-1-9) obtained from the Michigan Molecular Institute, 3.45 percent by weight of BASACID BLACK X-34 TM obtained from BASF Chemicals and 72.00 percent by weight of deionized water. This solution was stirred with a magnetic stirrer for 3 hours. The mixture was filtered through a 0.45 micron filter. There resulted a black ink with a viscosity of 2.33 centipoise, a surface tension of 47.5 millinewtons per meter, and a pH of 7.40. This ink has a latency of 45 seconds at 15 percent RH.

Other embodiments and modifications of the present invention may occur to those skilled in the art subsequent to a review of the information presented herein; these embodiments and modifications, as well as equivalents thereof, are also included within the scope of this invention.

| | | COMPOSITION OF GRAFTED-DENDRIMER INKS[1] | | | | |
|---|---|---|---|---|---|---|
| EXAMPLE NO. | CODE | Dye Type | Dye Concentration (%/weight) | Dendrimer Type | Dendrimer Concentration (%/weight) | Water (%/weight) |
| I | Control A-1 | Food Black #2 | 3.00 | None | 0.0 | 73.45 |
| II | Control A-2 | Food Black #2 | 3.00 | 1st Gen/Not Grafted/Technical | 0.5 | 72.95 |
| III | A-3 | Food Black #2 | 3.00 | DRS-I-9 50% grafted | 0.5 | 72.95 |
| IV | A-4 | Food Black #2 | 3.00 | DRS-I-10 95% grafted | 0.5 | 72.95 |
| V | Control B-1 | Direct Black 168 | 3.00 | 1st Gen/Not Grafted/Technical | 0.5 | 72.95 |
| VI | B-2 | Direct Black 168 | 3.00 | DRS-I-9 50% grafted | 0.5 | 72.95 |
| VII | B-3 | Direct Black 168 | 3.00 | DRS-I-10 95% grafted | 0.5 | 72.95 |
| VIII | Control C-1 | Basacid Black X-34 | 3.45 | None | 0.0 | 73.00 |
| IX | C-2 | Basacid Black X-34 | 3.45 | DRS-I-9 50% grafted | 1.0 | 72.00 |
| X | C-3 | Basacid Black X-34 | 3.45 | DRS-I-10 95% grafted | 1.0 | 72.00 |

[1]All inks contain: 0.05% of Polyethylene oxide (18,500 MW), 20% of Ethylene glycol, and 3.5% of Isopropanol

EXAMPLE X (C-3)

There was prepared an ink composition as follows. A solution was prepared by combining at room temperature, about 25° C. throughout, 20 percent by weight of ethylene glycol, obtained from BDH Inc., Toronto, Ontario, Canada, 3.5 percent by weight of isopropanol obtained from Aldrich Chemical Corporation, 0.05 percent by weight of polyethylene oxide, $M_w$ 18,500, obtained from Polysciences, 0.5 percent by weight of the STARBURST TM dendrigraft of the first generation in which approximately 95 percent of the primary amines are grafted with ethylene oxide oligomers with 7 ethylene oxide repeat units (DRS-1-10) obtained from the Michigan Molecular Institute, 3.45 percent by weight of BASACID BLACK X-34 TM obtained from BASF Chemicals and 72.00 percent by weight of deionized water. This solution was stirred with a magnetic stirrer for 3 hours. The mixture was filtered through a 0.45 micron filter. There resulted a black ink with a viscosity of 2.40 centipoise, a surface tension of 47.5 millinewtons per meter, and a pH of 7.40. The ink has a latency of 50 seconds at 15 percent RH.

| PROPERTIES OF GRAFTED-DENDRIMER INKS[1] | | | | | |
|---|---|---|---|---|---|
| EXAMPLE NO. | CODE | Viscosity (cP) | Surface Tension (mN/m) | pH | Latency (seconds) |
| I | Control A-1 | 2.21 | 47.8 | 7.66 | 100 |
| II | Control A-2 | 2.25 | 48.6 | 8.53 | 45 |
| III | A-3 | 2.26 | 47.5 | 8.49 | 200 |
| IV | A-4 | 2.20 | 48.2 | 8.48 | 150 |
| V | Control B-1 | 2.23 | 44.8 | 8.61 | 50 |
| VI | B-2 | 2.19 | 48.0 | 8.48 | 30 |
| VII | B-3 | 2.33 | 47.4 | 8.33 | 50 |
| VIII | Control C-1 | 2.12 | 48.0 | | 60 |
| IX | C-2 | 2.33 | 47.3 | 7.82 | 45 |
| X | C-3 | 2.40 | 47.5 | 7.40 | 50 |

[1]All inks contain: 0.05% of Polyethylene oxide (18,500 MW), 20% of Ethylene glycol, and 3.5% of Isopropanol

| | | WATERFASTNESS OF GRAFTED-DENDRIMER INKS ON SELECTED PAPERS | | | | |
|---|---|---|---|---|---|---|
| | | WATERFASTNESS (%) | | | | |
| EXAMPLE NO. | CODE | Rolland Paper | Hammermill Fore DP/20 lb | Nekoosa Ardor Xerocopy/20 lb | Classic Crest/ 24 lb/Kimberley-Clark | IP Alkaline (Ticonderoga) |
| II | Control A-2 | 62 | 71 | 72 | 49 | 71 |
| III | A-3 | 35 | 66 | 59 | 27 | 65 |
| IV | A-4 | 35 | 61 | 61 | 24 | 63 |
| V | Control B-1 | 68 | 79 | 77 | 61 | 90 |
| VI | B-2 | 53 | 81 | 76 | 42 | 86 |
| VII | B-3 | 57 | 80 | 75 | 49 | 82 |

What is claimed is:

1. An aqueous ink composition comprised of a solution comprised of a dye and a grafted dendrimer.

2. An aqueous ink in accordance with claim 1 wherein the solution contains water, a humectant, and a biocide.

3. An aqueous ink in accordance with claim 1 wherein the dendrimer is grafted with a nonionic alkylene oxide oligomer.

4. An aqueous ink in accordance with claim 1 wherein the dendrimer is grafted with an ethylene oxide oligomer.

5. An aqueous ink in accordance with claim 1 wherein the dendrimer is grafted with a nonionic ethylene oxide oligomer, and wherein each ethylene oxide oligomer contains about 1 to about 45 ethylene oxide units.

6. An aqueous ink in accordance with claim 1 wherein the dye is Food Black #2, Direct Black 168, or Basacid Black X-34.

7. An aqueous ink in accordance with claim 1 wherein the dye is present in an amount of about 0.01 to about 10 percent by weight, and the solution contains water in an amount of from about 50 to about 98 percent by weight.

8. An aqueous ink in accordance with claim 1 containing a humectant present in the amount of from about 2 to about 50 percent by weight.

9. An aqueous ink in accordance with claim 8 wherein the humectant is an aliphatic glycol.

10. An aqueous ink in accordance with claim 8 wherein the humectant is a glycol selected from the group consisting of ethylene glycol, propylene glycol, diethylene glycol, and mixtures thereof.

11. An aqueous ink in accordance with claim 10 with a biocide present in the amount of from about 0.02 to about 0.1 percent by weight.

12. An aqueous ink in accordance with claim 1 wherein the dendrimer is a first, second, third, or fourth generation grafted dendrimer.

13. An aqueous ink in accordance with claim 5 wherein the dendrimer is grafted with a nonionic ethylene oxide oligomer, and wherein the percent grafting ranges from 5 to 95 percent of the number of amino terminated groups.

14. An aqueous ink in accordance with claim 3 wherein the ink contains a mixture of two grafted dendrimers with different levels of grafting.

15. An aqueous ink in accordance with claim 1 wherein the ink contains a mixture of grafted dendrimers with different levels of grafting.

16. An aqueous ink in accordance with claim 1 wherein the solution contains water and additives selected from the group consisting of surfactants, wetting agents, and dispersing agents.

* * * * *